(12) United States Patent
Jeon et al.

(10) Patent No.: US 9,656,871 B2
(45) Date of Patent: May 23, 2017

(54) EDGE-FUNCTIONALIZED GRAPHITIC MATERIAL THROUGH MECHANOCHEMICAL PROCESS AND MANUFACTURING METHOD THEREOF

(75) Inventors: In Yup Jeon, Chungcheongbuk-do (KR); Jong Beom Baek, Ulsan (KR)

(73) Assignee: UNIST (ULSAN NATIONAL INSTITUTE OF SCIENCE AND TECHNOLOGY), Ulsan (KR)

( * ) Notice: Subject to any disclaimer, the term of this patent is extended or adjusted under 35 U.S.C. 154(b) by 454 days.

(21) Appl. No.: 13/270,198

(22) Filed: Oct. 10, 2011

(65) Prior Publication Data

US 2013/0018204 A1 Jan. 17, 2013

(30) Foreign Application Priority Data

Jul. 14, 2011 (KR) ........................ 10-2011-0069886

(51) Int. Cl.
| | | |
|---|---|---|
| *C01B 31/04* | (2006.01) | |
| *C07C 51/00* | (2006.01) | |
| *C07C 209/00* | (2006.01) | |
| *C07C 309/38* | (2006.01) | |
| *C07C 211/61* | (2006.01) | |
| *C07C 303/02* | (2006.01) | |
| *C07C 63/49* | (2006.01) | |
| *B82Y 30/00* | (2011.01) | |
| *B82Y 40/00* | (2011.01) | |

(52) U.S. Cl.
CPC ............... *C01B 31/04* (2013.01); *B82Y 30/00* (2013.01); *B82Y 40/00* (2013.01)

(58) Field of Classification Search
CPC ..................................................... C01B 31/04

USPC .......................................................... 423/448
See application file for complete search history.

(56) References Cited

U.S. PATENT DOCUMENTS

2011/0017587 A1* 1/2011 Zhamu et al. ........... 204/157.62

FOREIGN PATENT DOCUMENTS

| JP | 62-265110 | 11/1987 |
|---|---|---|
| WO | WO 2008/048192 A1 | 4/2008 |

OTHER PUBLICATIONS

Perry's Chemical Engineer's Handbook, Eighth Edition pp. 21-62 to 21-68 (McGraw-Hill 2008).*
Hou, et al., Parameters optimization of a nano-particle wet milling process using the Taguchi method, response surface method and genetic algorithm, Powder Technology 2007; 173: 153-162.*
Takacs, Self-sustaining reactions induced by ball milling, Progress in Materials Science 2002; 47: 335-414.*
Gusev, et al., Production of nanocrystalline powders by high-energy ball milling: model and experiment, Nanotechnolgoy 2008; 19: 265302—pp. 1-8.*

(Continued)

*Primary Examiner* — Daniel C McCracken
(74) *Attorney, Agent, or Firm* — Nixon & Vanderhye P.C.

(57) ABSTRACT

Disclosed is an edge-functionalized graphitic material manufactured by using a mechanochemical process. The edge-functionalized graphitic material is manufactured by pulverizing graphite in the presence of a variety of atmospheric agents in the form of gas phase, liquid phase, or solid phase. The edge-functionalized graphitic material, which is a precursor applicable into various fields, is expected to replace the prior art oxidized graphite.

10 Claims, 2 Drawing Sheets

(56) References Cited

OTHER PUBLICATIONS

Li, et al., Surface modified graphite nanosheets used as adsorbent to remove 1,2-dichlorobenzene from water, Materials Letters 2009; 63: 930-932.*
Ong, et al., Effect of atmosphere on the mechanical milling of natural graphite, Carbon 2000; 38: 2077-2085.*
Janot, et al., Ball-milling: the behavior of graphite as a function of the dispersal media, Carbon 2002; 40: 2887-2896.*
Antisari, et al., Low energy pure shear milling: A method for the preparation of graphite nano-sheets, Scripta Materialia 2006; 55: 1047-1050.*
Synthesis of Graphene-Based Nanosheets via Chemical Reduction of Exfoliated Graphite Oxide; Sasha Stanovich, Dmitriy A. Dikin, Richard D. Piner, Kevin A. Kohlhaas, SonBinh T. Nguyen, Rodney S. Ruoff; Carbon 45 (2007) 1558-1565.
Electric Filed Effect in Atomically Thin Carbon Films; K.S. Novoselov, et al.; Science 306, 666-669 (2004); DOI: 10.1126/science.1102896; Oct. 22, 2004, vol. 306 Science, www.sciencemag.org.
Large-Scale Pattern Growth of Graphene Films for Stretchable Transparent Electrodes; Keun Soo Kim, yue Zhao, Houk Jang, Sang Yoon Lee, Jong Min Kim, Kwang S. Kim, Jong Hyun Ahn, Philip Kim, Jae-Young Choi, Byun Hee Hong; Publised online Jan. 14, 2009; 2009 MacMillan Publishers LImited. pp. 706-710.

* cited by examiner

| Sample | C (%) | H (%) | N (%) | O (%) | S (%) |
|---|---|---|---|---|---|
| Graphite | 99.64 | - | - | 0.13 | - |
| ECG<br>Embodiment 1 | 72.04 | 1.01 | - | 26.46 | - |
| ESG<br>Embodiment 2 | 79.58 | 0.62 | - | 9.36 | 9.35 |
| EAG<br>Embodiment 3 | 88.83 | 1.21 | 4.49 | 3.69 | - | though a step of mechanically pulverizing
EDGE-FUNCTIONALIZED GRAPHITIC MATERIAL THROUGH MECHANOCHEMICAL PROCESS AND MANUFACTURING METHOD THEREOF

FIELD OF THE INVENTION

The present invention relates to an edge-functionalized graphitic material and a manufacturing method thereof using a mechanochemical process, more particularly to an edge-functionalized graphitic material and a manufacturing method thereof, through a step of mechanically pulverizing graphite in the presence of one or more atmospheric agents.

BACKGROUND OF THE INVENTION

Graphene is a new material with superb physical and electrical characteristics and has been considered the most notable material in the future. Several manufacturing techniques for graphene have been reported, such as Mechanical Exfoliation, Chemical Exfoliation, Exfoliation-Reintercalation-Expansion, Chemical Vapor Deposition, Epitaxy Synthesis, Chemical Synthesis, and so forth.

The mechanical exfoliation technique allows graphene to show its own excellent characteristics, but its final yield is extremely low, so this technique has been used in labs just for the studies on properties of graphene.

Although it has been reported that graphene manufactured by chemical vapor deposition has superb characteristics, this technique has some disadvantages, such as the use of heavy metal catalysts, complicated processes and its poor economic efficiency, thereby being restricted from being in the mass production of graphene.

The epitaxy synthesis technique has disadvantages in that the electrical property of the produced graphene is not good enough and the substrate is very expensive.

Accordingly, the most commonly used method for manufacturing graphene includes the steps of producing oxidized graphite by a chemical method, obtaining oxidized graphene via ultrasonic treatments, and deoxidizing the oxidized graphene to form graphene. Since the oxidized graphite produced in the above-mentioned method is, however, on the whole functionalized, it is likely to show lower physical and electrical characteristics. In addition, it is difficult to estimate that by which functional groups and how much the oxidized graphite will be functionalized. Thus, the estimation for the second-order reaction becomes also very difficult. As a result, finally produced graphene tends to lose its characteristic properties, so that the graphene manufactured using the oxidized graphite is strongly retrained from being used in various application fields, such as transparent electrodes, etc.

SUMMARY OF THE INVENTION

Technical Problem

The present invention provides an edge-functionalized graphitic material that is functionalized by using a mechanochemical process.

Namely, the present invention provides a manufacturing method of an edge-functionalized graphitic material which includes a step for mechanically pulverizing graphite in the presence of atmospheric agents which may be in the form of the gas phase, the liquid phase, or the solid phase, and an edge-functionalized graphitic material manufactured by this method.

The edge-functionalized graphitic material according to the present invention is a precursor which may be applicable to a variety of fields. It can be expected that the functionalized graphitic material according to the invention, which has a lot of functional groups bonded at its edges, could replace the prior art oxidized graphite.

Unlike the prior art oxidized graphite, the graphitic material of the present invention is functionalized only at its edges, so that it may be anticipated that the graphitic material of the invention would have more superior physical and electrical properties than those of the oxidized graphite.

For the prior art oxidized graphite, it cannot be estimated that what kind of functional groups and how much functional groups the prior art oxidized graphite includes. But, according to the present invention, the type and degree of the functional groups bonded at the edge of graphitic material can be verified. Accordingly, the prediction for the second-order reaction using this edge-functionalized graphitic material according to the invention is possible.

Moreover, when the functionalized graphitic material according to the invention is further processed, more graphene may be manufactured than in the prior art method using the oxidized graphite.

Technical Solution

The present invention is to provide a method of manufacturing an edge-functionalized graphitic material which includes a step for mechanically pulverizing graphite in the presence of one or more atmospheric agents in the form of a gas phase, a liquid phase, or a solid phase.

In addition, the present invention provides an edge-functionalized graphitic material manufactured by the above-mentioned manufacturing method of edge-functionalized graphitic material of the invention.

Preferably, the functional groups bonded at the edge of the edge-functionalized graphitic material may be included in a proportion of 0.01 to 50% by weight, relative to the total weight of the edge-functionalized graphitic material.

Advantageous Effects of Invention

The present invention relates to a method for functionalizing the edge(s) of graphite during the pulverization of the graphite, and an edge-functionalized graphitic material manufactured by such a method.

The present invention can provide a method capable of functionalizing the edge of graphite by pulverizing a large piece of graphite into small pieces of graphitic material while providing various atmospheric agents in the form of a gas phase, a liquid phase, or a solid phase, and it has a variety of advantages in that the process is very simple, economical, and applicable to the mass-production of graphene.

Moreover, the type and degree of the functional groups bonded to graphite can be controlled according to the manufacturing method of the present invention. Accordingly, material highly applicable to a variety of fields could be provided.

In addition, the manufacturing method of the present invention itself is highly environmental-friendly so that a potential for commercialization may be very high.

In the prior art method of manufacturing oxidized graphite, the graphite was functionalized at its center area as well as its edge area. On the contrary, in the present invention graphite is functionalized only at edge, therefore graphitic material can have more superior physical and electrical characteristics than those of the prior art oxidized graphite.

In addition, the edge-functionalized graphitic material manufactured by the method according to the present invention can be considered a novel precursor for the practical application of graphite and graphene.

BRIEF DESCRIPTION OF DRAWINGS

The foregoing and other features and aspects of the invention will be best understood with reference to the following description of certain exemplary embodiments of the invention, when read in conjunction with the accompanying drawings, wherein.

DETAILED DESCRIPTION OF THE INVENTION

Figure 1:
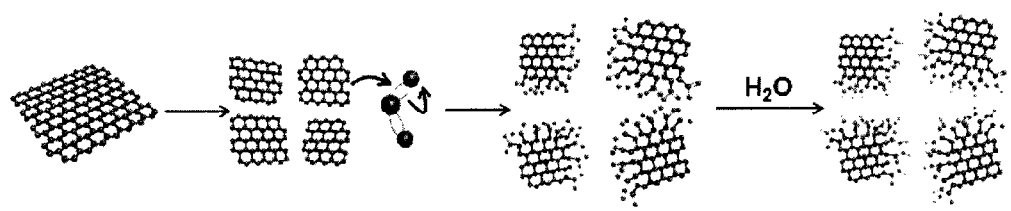
FIG. 1 shows a procedure of manufacturing an edge-functionalized graphitic material in accordance with a first exemplary embodiment of the invention, wherein the graphitic material is functionalized by carboxyl functional groups bonded at the edge thereof.

The present invention relates to a manufacturing method of an edge-functionalized graphitic material, and an edge-functionalized graphitic material manufactured by such a method.

The present invention provides a manufacturing method of an edge-functionalized graphitic material which includes a step for mechanically pulverizing graphite in the presence of one or more atmospheric agents.

Here, the atmospheric agents may be reactants that react with the mechanically pulverized graphite. The atmospheric agents may include all compounds in the form of a solid phase, a liquid phase, or a gas phase that comprise carbon compounds having 1 to 30 carbons or non-carbon compounds, which can be synthesized or are commercially available. For example, carbon compounds include alkane, alkene, compounds having alkyl group or the like having 1 to 30 carbons. Non-carbon compounds may include hydrogen, ammonia, water, sulfur trioxide, bromine, iodine, and so forth.

More preferably, gas phase agents may include, for example and not limited to, air, hydrogen, methane, ethane, carbon monoxide, carbon dioxide, nitrogen dioxide, ammonia, fluorine, chlorine, hydrogen fluoride, hydrogen bromide, hydrogen chloride, hydrogen cyanide, hydrogen sulfide, hydrogen iodide, and so forth. Liquid phase agents may include, for example and not limited to, water, methanol, ethanol, isopropyl alcohol, sulfuric acid, nitric acid, acetic acid, normal hexane, cyclohexane, heptane, toluene, benzene, acetone, N-methylpyrrolidone, tetrahydrofuran, dimethylacetamide, dimethylformamide, dimethyl sulfoxide, ethyl acetate, methylethylketone, xylene, dichlorobenzene, trichlorobenzene, dichloromethane, chloroform, carbon tetrachloride, bromine, tribromo boron, and so forth. Solid phase agents may include, for example and not limited to, iodine, sodium hydroxide, potassium hydroxide, sodium hydride, sodium hydrogen carbonate, sodium carbonate, potassium carbonate, sodium sulfate, sodium nitrate, sodium chloride, ammonium chloride, boron trioxide, boric acid, aminobenzoic acid, chlorobenzoic acid, bromobenzoic acid, thiolbenzoic acid, maleic acid, and so forth.

In addition, atmospheric agents may include combinations of one or more materials of solid phase, liquid phase or gas phase having the same or different properties. In such a case functionalized graphitic material manufactured by the method of the invention may have one or more functional groups.

In addition, when the atmospheric agents in the form of solid phase, liquid phase, or gas phase are explosive, inert gases may be mixed thereinto. Inert gases may include, for example but be not limited to, nitrogen, argon, helium, or neon, for example.

In the manufacturing method of the invention, the molar ratio of graphite to one or more atmospheric agents may be 1:0.1 to 1:20, more preferably 1:1 to 1:10. If the used quantity of graphite is greater than an upper limit value of a molar ratio, the produced graphite may be insufficiently functionalized at its edge and a production yield of functionalized graphitic material may be thus lowered.

In the manufacturing method of the invention, the vessel for pulverizing graphite may be made of any kind of materials, but metal vessels may be preferred. However, depending on the type of materials of vessel, any additional processes for removing residue originating from the vessel entering the final material during a step of pulverizing graphite may be needed.

For example, in the case of pulverizing graphite in a metal vessel, a removing process using an acid solution may be further performed to remove metal residue after the process of pulverizing graphite.

Here, the acid may be of 3 or less of Ph and may be hydrochloric acid, sulphuric acid, nitric acid, carbonic acid, phosphoric acid, acetic acid, or perchloric acid; and preferably may be hydrochloric acid, sulphuric acid, or nitric acid. In addition, it is preferred for the manufacture of the functionalized graphitic material that the acid is used in a range of 0.1 M to 5 M, more preferably in a range of 0.5 M to 2 M, that is, in the range of molar ratio of being slightly acid.

For the process for pulverizing graphite, the pulverizing may be performed for 1 to 100 hours with rates of 100 to 10,000 rpm, preferably for 20 to 72 hours with rates of 100 to 2,000 rpm.

In this way, according to the manufacturing method of the invention which includes the process for pulverizing graphite in the presence of one or more atmospheric agents in the form of solid, liquid, or gas phase, while the graphite is being pulverized in the pulverization process, where carbons in the edge area of graphite are charged with electrons or become radical, and these react with compounds surrounding agents in the form of liquid or gas phase or react with compounds present in surroundings in the form of a solid, a liquid or a gas phase and then react with water in the air, to produce an edge-functionalized graphitic material.

According to the present invention, during the pulverization process, the graphite is milled with carbons at the edge of the milled graphite being charged or becoming radical, and the charged or radical-type carbons at the edge react with compounds in the form of solid, liquid, or gas phase to produce graphite functionalized only at the edge part thereof.

The manufacturing method of the present invention will be described more specifically, for example in the case that the gas phase agent is carbon dioxide, In the pulverization process of graphite, carbons in the edge part of the graphite becomes charged or becomes radical types, and this charged or radical-type carbon reacts with carbon dioxide present in surroundings and then reacts with water in the air, to produce graphite whose edges are functionalized with carboxyl group.

According to embodiments of the manufacturing method of edge-functionalized graphitic material of the invention, the edge-functionalized graphitic material may be manufactured by bonding functional groups at the edge of the graphite, wherein the functional groups may be selected from a group consisting of alkyl group, alkenyl group, alkynyl group, arenyl group, tert-butyl group, cycloheyl group, hydroxyl group, lactone group, lactam group, ether group, amine group, amide group, imine group, amino group, imide group, azide group, cyanic acid group, nitryl group, nitroxy group, nitro group, nitroso group, pyridine group, phosphine group, phosphoric acid group, phosphonic acid group, sulfone group, sulfonic acid group, sulfoxide group, thiol group, sulfide group, carbonyl group, aldehyde group, carboxyl group, carboxyl acid salt group, carboxyl acid ester group, haloformyl group, ether group, ester group, peroxy group, hydroperoxy group, acyl halide group, fluoro group, chloro group, bromo group, iodo group, and combinations thereof.

The functional groups may be alkyl group having 1 to 30 carbons, alkenyl group having 2 to 30 carbons, alkynyl group having 2 to 30 carbons, cycloalkyl group having 3 to 30 carbons, aryl group having 6 to 30 carbons, or aralkyl group having 6 to 30 carbons, wherein the alkyl group, the alkenyl group, the alkynyl group, the cycloalkyl group, the aryl group, or the aralkyl group may not be substituted, or may be a substituent selected from a group consisting of halo, nitro, amino, cyano, mercapto, hydroxy, alkyl having 1 to 30 carbons, alkoxy having 1 to 30 carbons, formyl, alkylcarbonyl having 1 to 30 carbons, phenyl, benzoyl, phenoxy, and combinations thereof.

According to the manufacturing method of edge-functionalized graphitic material of the invention, both edge-functionalized graphite and edge-functionalized graphene can be produced together.

The present invention is also directed to an edge-functionalized graphitic material manufactured by above mentioned manufacturing method.

The mean diameter of edge-functionalized graphite in the present invention is preferably 50 nm or more.

The edge-functionalized graphitic material includes 0.01 to 50% by weight of the functional groups bonded at the edge of the edge-functionalized graphite, relative to the total weight of the edge-functionalized graphitic material.

With respect to the description of the edge-functionalized graphitic material according to the present invention, in order to avoid repetition, the details of the edge-functionalized graphitic material will refer to the description of the manufacturing method of graphitic material according to the present invention.

In the following, although preferred embodiments of the present invention is described in detail, It is intended that the present specification and examples be considered as exemplary only with a true scope and spirit of the teachings being indicated by the following claims and equivalents thereof.

Embodiment 1: Manufacturing an Edge-Functionalized Graphitic Material

Graphite (99%, 100 mesh) 5 g and dry ice 100 g were placed into a pulverization metal vessel. After removing air from the pulverization vessel using a vacuum pump, a pulverization process was performed for 48 hours with about 500 rpm. After the pulverization was completely finished, metal impurities entered into the pulverized graphite material were removed by treating the pulverized material with hydrochloric acid of 1 M, followed by a lyophilization process to obtain graphitic material whose edge is functionalized with carboxyl group. Functional group was identified by elementary analyzing the obtained graphitic material (see FIG. 4). FIG. 1 depicts, as an example, steps of the method for manufacturing graphitic material functionalized at its edge with carboxyl functional group.

It can be found in FIG. 1 that a large piece of graphite was grinded to many smaller pieces of graphite where the milled graphite was charged or became radical at the edge thereof, and the charged or radical edge reacted with $CO_2$ and subsequently water in the atmosphere to produce graphite having edge-functionalized with carboxyl group.

Figure 2:
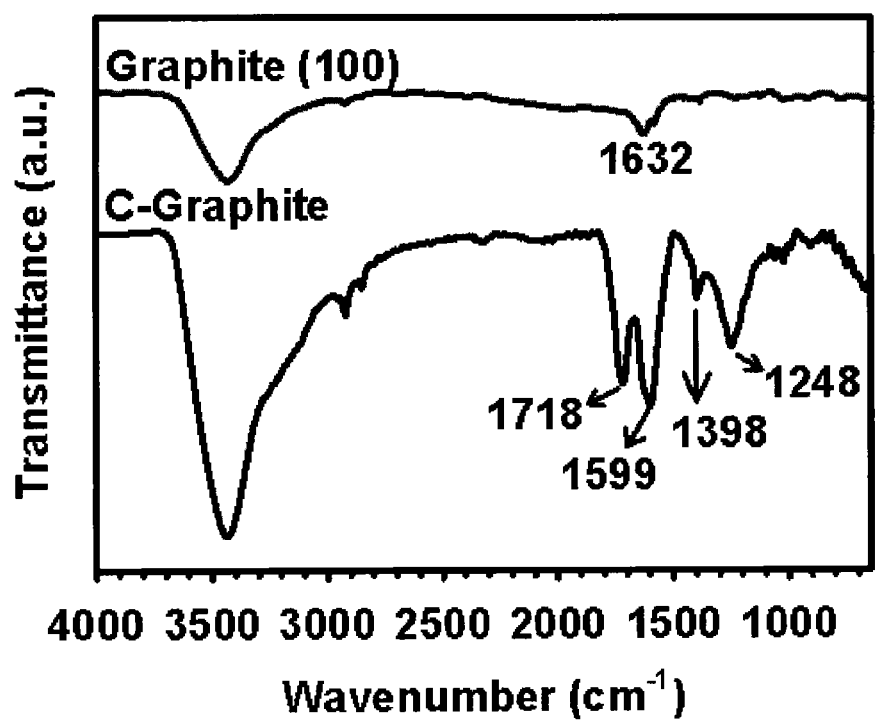
FIG. 2 shows an infrared spectrum of the edge-functionalized graphitic material in accordance with the first exemplary embodiment of the invention, wherein the graphitic material is functionalized by carboxyl functional groups bonded at the edge thereof.

Experiment 1: Identifying Functional Group of Edge-Functionalized Graphitic Material To identify functional groups of the edge-functionalized graphite manufactured by the manufacturing method of the invention, a FT-IR spectrum of the graphite manufactured by the embodiment 1 was analyzed. Jasco FT-IR 480 Plus spectrophotometer was used. In the image, a peak of 1718 $cm^{-1}$ was identified, which showed that the graphite of the embodiment 1 of the invention was functionalized by carboxyl group (see FIG. 2).

Figures 3, 4:
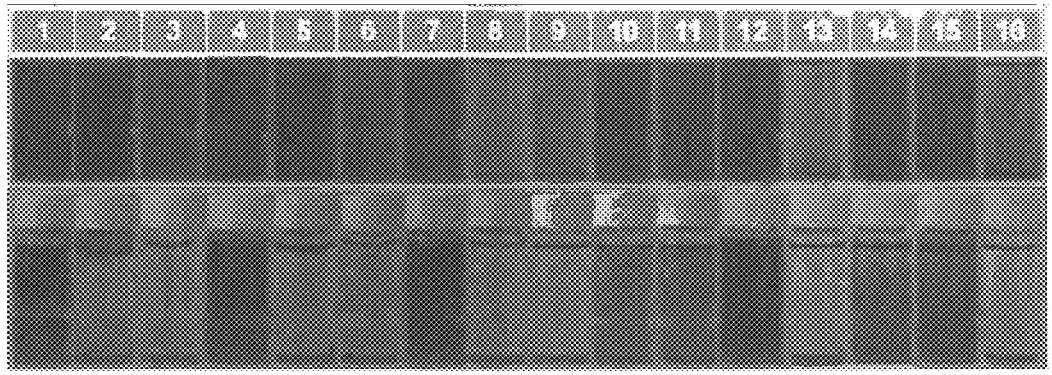
FIG. 3 is an image showing a degree of dispersion in various solvents of the edge-functionalized graphitic material having carboxyl functional groups bonded at the edge thereof in accordance with the first exemplary embodiment of the invention, wherein the photo at the upper part is taken at the time of elapse of 30 seconds after the edge-functionalized graphitic material is dispersed in a solvent, while the photo at the lower part is taken at the time of elapse of 1 week elapsed after the edge-functionalized graphitic material is dispersed in a solvent.
FIG. 4 is elementary analysis data of the edge-functionalized graphitic material having carboxyl functional groups bonded at the edge thereof, in accordance with the first exemplary embodiment of the invention.

Experiment 2: Identifying Dispersibility of the Edge-Functionalized Graphitic Material To identify dispersibility of the edge-functionalize graphite manufactured by the manufacturing method of the invention, the graphitic material manufactured by the embodiment 1 was mixed with a variety of solvents which include $H_2O$ (1M), HCl (1M), $NH_4OH$ (7M), $NH_4OH$ (1M), KOH, MeOH, isopropyl alcohol (IPA), acetone, tetrahydrofuran (THF), dimethylformamide (DMF), dimethylacetamide (DMAc), N-methylpyrrolidone (NMP), $CH_2Cl_2$, toluene, hexane, ethyl acetate, etc. The degree of dispersion was then measured using laser. FIG. 3 showed an image showing dispersibility in various solvents checked by the above-mentioned way, wherein the photo at the upper part is taken at the time of elapse of 30 seconds after the edge-functionalized graphitic material is dispersed in a solvent, while the photo at the lower part is taken at the time of elapse of 1 week elapsed after the edge-functionalized graphitic material is dispersed in a solvent; From this image, it can be seen that the edge-carboxyl functionalized graphitic material of the invention was kept in a high degree of dispersion even in 1 week after the dispersion.

Experiment 3: Elementary Analysis of Edge-Functionalized Graphitic Material

For the edge-functionalize graphite of the invention manufactured by the embodiment 1, elementary analysis was performed. FIG. 4 showed elementary analysis data thereof, which showed that edge-functionized graphite according to the present invention was remarkably higher in the content of oxygen than pure graphite due to the functionalization.

Embodiment 2: Manufacturing the Edge-Functionalized Graphitic Material II

Graphite (99%, 100 mesh) 5 g and sulfur trioxide ($SO_3$) 5 ml were placed into a metal pulverization vessel. After removing air from the metal pulverization vessel using a vacuum pump, a pulverization process was performed for 48 hours with about 500 rpm. After pulverization process was completely finished, metal impurities entering the pulverized graphite material was removed by treating the pulverized material with hydrochloric acid of 1 M, followed by a lyophilization process to obtain graphitic material functionalized at the edge with —SO3H. Functional group was identified by elementary analyzing the obtained graphitic material (see FIG. 4).

Embodiment 3: Manufacturing the Edge-Functionalized Graphitic Material III

Graphite (99%, 100 mesh) 5 g and ammonia gas were placed into a metal pulverization vessel. The amount of ammonia gas used in this embodiment was 250 ml taken from a full flask of 250 ml through a storage container of 8.75 atm. After removing air from the metal pulverization vessel using a vacuum pump, a pulverization process was performed for 48 hours with about 500 rpm. After the pulverization process was completely finished, metal impurities entering the pulverized material was removed by treating the pulverized material with hydrochloric acid of 1 M, followed by a lyophilization process to obtain graphitic material functionalized at the edge with —$NH_2$. Functional group was identified by elementary analyzing the obtained graphitic material (see FIG. 4).

| Description of Notations in Drawings |
|---|
| In FIG. 3, notations of 1 to 16 denote the following solvents, respectively. |
| 1: $H_2O$; 2: 1M HCl; 3: 1M $NH_4OH$; 4: 7M $NH_4OH$; 5: 1M KOH; 6: MeOH; 7: icosapentaenoic acid (IPA); 8: acetone; 9: tetrahydrofuran (THF); 10: dimethylformamide (DMF); 11: dimethylacetamide (DMAc); 12: N-methyl pyrrolidone (NMP); 13: $CH_2Cl_2$; 14: toluene; 15: hexane; 16: ethyl acetate. |
| In FIG. 4: |
| ECG denotes graphite functionalized with —COOH; ESG denotes graphite functionalized with —$SO_3H$; and EAG denotes graphite functionalized with —$NH_2$. |

The invention claimed is:

1. A manufacturing method of an edge-functionalized graphitic material comprising a step of mechanically pulverizing graphite in the presence of one or more atmospheric agents,
   wherein the edge-functionalized graphitic material has functional groups bonded at the edge thereof, and
   wherein the functional groups are selected from a group consisting of carboxyl group, amino group, phosphonic acid group, sulfonic acid group, fluoro group, chloro group, bromo group, iodo group.

2. The method of claim 1, wherein the step for pulverizing is performed for 1 to 100 hours with 100 to 10,000 rpm.

3. The method of claim 1, wherein the edge-functionalized graphitic material has a mean diameter of 50 nm or more.

4. The method of claim 1, wherein the atmospheric agents are selected from a group consisting of hydrogen, methane, ethane, carbon monoxide, carbon dioxide, nitrogen dioxide, ammonia, fluorine, chlorine, hydrogen fluoride, hydrogen bromide, hydrogen chloride, hydrogen cyanide, hydrogen sulfide, hydrogen iodide, water, methanol, ethanol, isopropyl alcohol, sulfuric acid, nitric acid, acetic acid, normal hexane, cyclohexane, heptane, toluene, benzene, acetone, N-methyl pyrrolidone, tetrahydrofuran, dimethylacetamide, dimethylformamide, dimethyl sulfoxide, ethyl acetate, methylethylketone, xylene, dichlorobenzene, trichlorobenzene, dichloromethane, chloroform, carbon tetrachloride, bromine, tribromo boron, iodine, sodium hydroxide, potassium hydroxide, sodium hydride, sodium hydrogen carbonate, sodium carbonate, potassium carbonate, sodium sulfate, sodium nitrate, sodium chloride, ammonium chloride, boron trioxide, boric acid, aminobenzoic acid, chlorobenzoic acid, bromobenzoic acid, thiolbenzoic acid, maleic acid, and combinations thereof.

5. A manufacturing method of an edge-functionalized graphitic material comprising a step of mechanically pulverizing graphite in the presence of one or more atmospheric agents,
   wherein the edge-functionalized graphitic material has functional groups bonded at the edge thereof, and
   wherein the functional groups are selected from the carboxyl group.

6. The method of claim 5, wherein the atmospheric agents are selected from a group consisting of hydrogen, methane, ethane, carbon monoxide, carbon dioxide, nitrogen dioxide, ammonia, fluorine, chlorine, hydrogen fluoride, hydrogen bromide, hydrogen chloride, hydrogen cyanide, hydrogen sulfide, hydrogen iodide, water, methanol, ethanol, isopropyl alcohol, sulfuric acid, nitric acid, acetic acid, normal hexane, cyclohexane, heptane, toluene, benzene, acetone, N-methyl pyrrolidone, tetrahydrofuran, dimethylacetamide, dimethylformamide, dimethyl sulfoxide, ethyl acetate, methylethylketone, xylene, dichlorobenzene, trichlorobenzene, dichloromethane, chloroform, carbon tetrachloride, bromine, tribromo boron, iodine, sodium hydroxide, potassium hydroxide, sodium hydride, sodium hydrogen carbonate, sodium carbonate, potassium carbonate, sodium sulfate, sodium nitrate, sodium chloride, ammonium chloride, boron trioxide, boric acid, aminobenzoic acid, chlorobenzoic acid, bromobenzoic acid, thio benzoic acid, maleic acid, and combinations thereof.

7. The method of claim 5, wherein the step for pulverizing is performed for 1 to 100 hours with 100 to 10,000 rpm.

8. The method of claim 5, wherein the edge-functionalized graphitic material has a mean diameter of 50 nm or more.

9. The method of claim 6, wherein the step for pulverizing is performed for 1 to 100 hours with 100 to 10,000 rpm.

10. The method of claim 9, wherein the edge-functionalized graphitic material has a Mean diameter of 50 nm or more.

* * * * *